United States Patent
Böttigheimer et al.

(10) Patent No.: US 11,894,696 B2
(45) Date of Patent: Feb. 6, 2024

(54) METHOD AND APPARATUS FOR DETECTING ELECTRICALLY CONDUCTIVE FOREIGN BODIES DURING INDUCTIVE ENERGY TRANSMISSION

(71) Applicant: UNIVERSITÄT STUTTGART, Stuttgart (DE)

(72) Inventors: Mike Böttigheimer, Stuttgart (DE); Nejila Parspour, Gerlingen (DE); Stefanie Hermann, Stuttgart (DE)

(73) Assignee: UNIVERSITÄT STUTTGART, Stuttgart (DE)

( * ) Notice: Subject to any disclaimer, the term of this patent is extended or adjusted under 35 U.S.C. 154(b) by 333 days.

(21) Appl. No.: 17/415,089

(22) PCT Filed: Dec. 20, 2018

(86) PCT No.: PCT/EP2018/086201
§ 371 (c)(1),
(2) Date: Jun. 17, 2021

(87) PCT Pub. No.: WO2020/125994
PCT Pub. Date: Jun. 25, 2020

(65) Prior Publication Data
US 2022/0029470 A1 Jan. 27, 2022

(51) Int. Cl.
*H02J 50/60* (2016.01)
*H02J 50/10* (2016.01)
(Continued)

(52) U.S. Cl.
CPC ............ *H02J 50/60* (2016.02); *B60L 53/124* (2019.02); *H02J 7/00711* (2020.01); *H02J 50/10* (2016.02)

(58) Field of Classification Search
CPC ...................................................... H02J 50/60
(Continued)

(56) References Cited

U.S. PATENT DOCUMENTS

| 5,729,143 A | 3/1998 | Tavernetti et al. |
| 2010/0084918 A1 | 4/2010 | Fells et al. |

(Continued)

FOREIGN PATENT DOCUMENTS

| DE | 102012218589 A1 | 4/2014 |
| DE | 102017214603 A1 | 2/2019 |

*Primary Examiner* — Edward Tso
*Assistant Examiner* — Ahmed H Omar
(74) *Attorney, Agent, or Firm* — Renner, Kenner, Greive, Bobak, Taylor & Weber (57) ABSTRACT

In a method and an apparatus for detecting electrically conductive foreign bodies during inductive energy transmission between a primary coil (1) and a secondary coil (2), at least one sensor coil (5) is arranged between the primary coil (1) and the secondary coil (2), and a current flowing in the sensor coil (5) due to the induced voltage during the energy transmission is detected and evaluated. In this case, the sensor coil (5) is connected to at least one capacitor to form a resonant circuit which is matched to the excitation frequency of the primary coil (1). The phase position of the current in the resonant circuit in relation to a reference signal is then used to determine whether there are electrically conductive foreign bodies (4) between the primary coil (1) and the secondary coil (2). A high degree of sensitivity, also in relation to small electrically conductive foreign bodies within the energy transmission path, is achieved by means of the method and the apparatus.

12 Claims, 4 Drawing Sheets

(51) Int. Cl.
*B60L 53/124* (2019.01)
*H02J 7/00* (2006.01)

(58) Field of Classification Search
USPC .......................................................... 320/108
See application file for complete search history.

(56) References Cited

U.S. PATENT DOCUMENTS

| | | | |
|---|---|---|---|
| 2013/0241300 A1* | 9/2013 | Miyamoto | H02J 50/12 |
| | | | 307/104 |
| 2013/0293026 A1 | 11/2013 | Miyamoto et al. | |
| 2014/0015329 A1* | 1/2014 | Widmer | B60L 53/37 |
| | | | 307/104 |
| 2015/0349541 A1 | 12/2015 | Yamamoto et al. | |
| 2016/0187520 A1 | 6/2016 | Widmer et al. | |

* cited by examiner

METHOD AND APPARATUS FOR DETECTING ELECTRICALLY CONDUCTIVE FOREIGN BODIES DURING INDUCTIVE ENERGY TRANSMISSION

TECHNICAL FIELD OF APPLICATION

The present invention relates to a method for detecting electrically conductive foreign bodies during inductive energy transmission between a primary coil and a secondary coil, in particular during inductive charging processes, in which method at least one sensor coil is arranged between the primary coil and the secondary coil, and a current indicated in the sensor coil during the energy transmission is detected and evaluated. The invention also relates to an apparatus which is designed to carry out the method.

Inductive energy transmission is a contactless transmission technology which can be used, for example, to charge the rechargeable battery of an electric vehicle. Therein, the primary coil is located in the ground below a parking space and the secondary coil on the underbody of the vehicle. The advantage of such a charging system is that no charging cable has to be plugged in manually and the components of the primary side are sunk into the ground, such that they do not take up space above ground and are not at risk of being damaged by vandalism. A problem with such inductive transmission paths, however, is that metallic foreign bodies, such as coins, can easily enter the transmission field.

In an alternating magnetic field, electrically conductive foreign bodies are heated by induced eddy currents and remagnetisation. The extent to which they are heated depends both on the electrical conductivity and magnetic permeability of the object as well as on the magnetic flux density and the frequency of the field. Heating such a foreign body introduces the risk of persons getting burns from the foreign body or that a fire is caused by the high heat of the foreign body. Especially at high transmission levels, it is therefore necessary to detect any electrically conductive foreign bodies within the transmission path between the primary coil and the secondary coil to be able to interrupt the energy transmission in case of such a detection.

PRIOR ART

There are many different previously known methods for detecting electrically conductive foreign bodies within such transmission paths. Foreign bodies can be detected by means of camera surveillance, light barriers, temperature monitoring, measurement of the weight force on the primary coil, monitoring of the electrical values of the primary coil, or by means of separate sensor coils. However, camera and lighting systems are easily contaminated. The weight force measurement is impaired by rain or snow and is too inaccurate for small objects. Temperature monitoring can also be impaired by environmental influences and only detects a foreign body when it is already very hot. Measurable properties in the primary coil change only slightly with small foreign bodies. The detection is therefore too inaccurate and unreliable for small objects.

DE 10 2012 218 589 A1 discloses a charging apparatus for charging the energy storage device of a portable electrical device, in which a sensor coil arrangement having at least one sensor coil within the transmission path is used, wherein the frequency detuning or phase shift of said sensor coil is used to determine whether an electrically conductive foreign body is located within the transmission path. In one embodiment of said disclosure, the sensor coil is connected between a reference potential and the first input of a synchronous rectifier, the second input of which is connected to the resonance circuit for exciting the primary coil. A phase difference between the resonance circuit and the sensor coil can be detected by means of the synchronous rectifier. This method, however, only allows for detecting foreign bodies which generate a power dissipation greater than about 1% of the nominal power. This means that the method is not suitable for the inductive charging of electric vehicles, during which power transmissions of 3 kW to 20 kW can occur. In this case, an electrically conductive foreign body could absorb powers of 30 to 200 W without it being detected by the method disclosed in that publication. Furthermore, this method cannot be adapted to changes in the operating point of the primary circuit, such as switching the inductive load on the inverter. Thus, a change of this operating point could result in detection errors.

The problem underlying the present invention is to provide a method and an apparatus for detecting electrically conductive foreign bodies during the inductive energy transmission between a primary coil and a secondary coil, by means of which even small foreign bodies with low power dissipation can be reliably detected.

DESCRIPTION OF THE INVENTION

The problem is solved by the method and the apparatus according to claims 1 and 9. Advantageous embodiments of the method and the apparatus are the subject matter of the dependent claims or can be seen in the following description and the exemplary embodiment.

In the proposed method, at least one sensor coil is arranged between the primary coil and the secondary coil of the energy transmission path, and a current induced in the sensor coil during the energy transmission is detected and evaluated. The terms primary coil, secondary coil and sensor coil refer to components which are formed from at least one winding or conductor loop of a current conductor. In the proposed method, the sensor coil is connected to at least one capacitor to form a closed resonant circuit—hereinafter also referred to as a sensor resonant circuit—which is matched to the excitation frequency of the primary coil. This excitation frequency for the primary coil is determined in the previously known manner via a suitable control circuit. The resonant circuit having the sensor coil thus comprises at least the sensor coil and the capacitor, which are selected such that they are suitable for matching the excitation frequency of the primary coil. The inductance of the sensor coil is selected significantly lower than the inductance of the primary coil, preferably by a factor of at least 5 and particularly preferably of at least 30 lower than the inductance of the primary coil. The phase position of the detected current in the sensor resonant circuit in relation to a reference signal is then used to determine whether there are electrically conductive foreign bodies between the primary coil and the secondary coil.

Metallic or other electrically conductive foreign bodies influence the behaviour of coupled coils by changing the coupling factor and the self-inductances and thus the amplitude and phase position of the current in the sensor coil. Therein, the phase position of the current also changes compared to a reference signal, e.g., the voltage at the primary coil. If the amount of the phase position or the phase shift in relation to the reference signal moves outside a predefinable tolerance range, this is a sign of electrically conductive foreign bodies within the transmission path, and the energy transmission is preferably interrupted.

The proposed apparatus comprises at least one sensor coil which is arranged above the primary coil, preferably at a distance of more than 1 mm and less than 5 cm and below the upper edge of the structure on which foreign bodies can come to rest, preferably at a distance of less than 1 cm from this upper edge. Accordingly, the sensor coil is connected to at least one capacitor to form a resonant circuit which is matched to the excitation frequency of the primary coil and connected to an evaluating device. The evaluating device is designed such that it detects the current in the sensor resonant circuit and uses the phase position of the current in the sensor resonant circuit in relation to a reference signal to determine whether there are electrically conductive foreign bodies between the primary coil and the secondary coil.

Connecting the sensor coil in a closed resonant circuit, which is matched to the excitation frequency of the primary coil, results in a highly sensitive detection of foreign bodies within the energy transmission path. Using a closed resonant circuit enables a potential-free current measurement with high amplitude and, in the case of interference coupling, a clear detection of zero crossings due to the high amplitude. Even small electrically conductive foreign bodies cause a clearly measurable phase shift of the current in the sensor resonant circuit in relation to the reference signal due to the resulting detuning of the sensor resonant circuit. As a result, the proposed method and the associated apparatus can be used to reliably detect even small electrically conductive foreign bodies with low power dissipation.

The method and the apparatus also enable an adaptation to a change in the operating point in the primary circuit with the primary coil, by calibrating the detecting device consisting of sensor resonant circuit and evaluating device after each change in the operating point of the primary circuit. During this calibration, the phase position of the current in the sensor resonant circuit in relation to the reference signal is detected without foreign bodies between the primary and secondary coils. It must thus be ensured by other means, e.g. by visual inspection or by additional methods, that no foreign body is present within the transmission path during calibration. A phase shift detected during this calibration between the current in the sensor resonant circuit and the reference signal is then compensated or taken into account in the evaluation when carrying out subsequent detection processes. The compensation can be carried out via a delay element for the detected current signal, for example. The phase shift detected during calibration can also be subtracted in a controller of the evaluating device from the phase position of the current in the sensor resonant circuit, which was detected during the detection step. Another possible way of compensating is to adjust the capacitance in the sensor resonant circuit accordingly. This can be done, for example, by having the sensor resonant circuit connected to a cascade of capacitors which can be added to the circuit individually or in groups. The calibration thus performs offset adjustments to the usual phase offset between current and voltage in the primary circuit.

In the proposed method and the associated apparatus, the voltage curve in the primary circuit, in particular the voltage at the primary coil, the input voltage of the primary circuit, or the output voltage of the inverter is preferably used as a reference signal. If the excitation of the primary coil or the primary circuit is based on a PWM signal (PWM: pulse width modulation), this PWM signal is preferably used as a reference signal.

It is also possible to arrange multiple sensor coils distributed across the surface of the primary coil or at defined positions above this surface. Crossing the sensor coils is also possible. In this case, each sensor coil in turn is connected to at least one capacitor to form a sensor resonant circuit which is matched to the excitation frequency of the primary coil. It is also possible to determine the approximate position of a detected foreign body by comparing the phase positions of the current determined in the individual sensor resonant circuits to the reference signal and the positions of the respective sensor coils. Therein, the foreign body is closest to that sensor coil in which the largest phase shift in relation to the reference signal is determined. Furthermore, a more precise localization of the foreign body can be carried out, for example, by means of triangulation or similar techniques on the basis of the respective detected phase shifts and the positions of the individual sensor coils.

The proposed method and the associated apparatus are particularly suitable for detecting foreign bodies in the automotive sector, as even the smallest electrically conductive objects can be detected regardless of the operating point of the primary circuit. The sensitivity of the detection is very high and is independent of the operating point of the energy transmission path. The sensitivity of the detection is also independent of the nominal transmission power within a wide range. The method and the apparatus are particularly suitable for applications with high power transmission capacities but can of course also be used in applications with lower power transmission capacities, if necessary.

SHORT DESCRIPTION OF THE DRAWINGS

In the following, the proposed method and the associated apparatus are explained again in more detail on the basis of exemplary embodiments in conjunction with the drawings. In these.

WAYS TO CARRY OUT THE INVENTION

Figure 1:
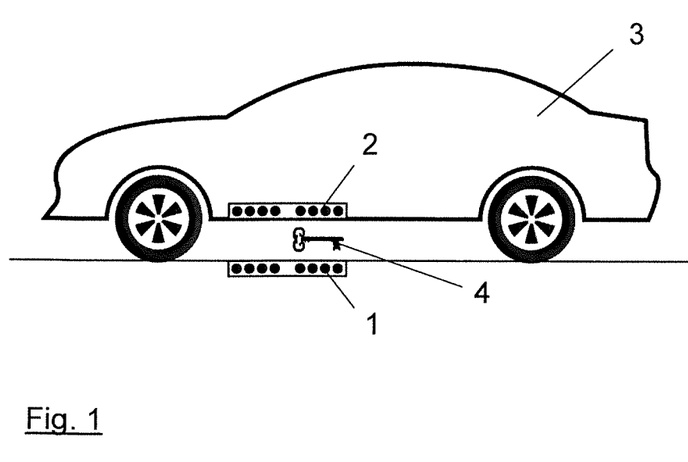
FIG. 1 is a schematic representation of the conditions during inductive energy transmissions, using the example of an electric vehicle.

When inductive energy transmission is used for charging an electric vehicle, the primary coil 1 is installed, for example, in the ground below a parking space and the secondary coil 2 is attached to the underbody of the vehicle 3, as shown in the simplified diagram in FIG. 1. If one or multiple metallic foreign bodies 4 are located within the transmission path between the primary coil 1 and the secondary coil 2, these foreign bodies 4 can be heated up by the alternating magnetic fields to such an extent that dangerous situations result.

Figure 2:
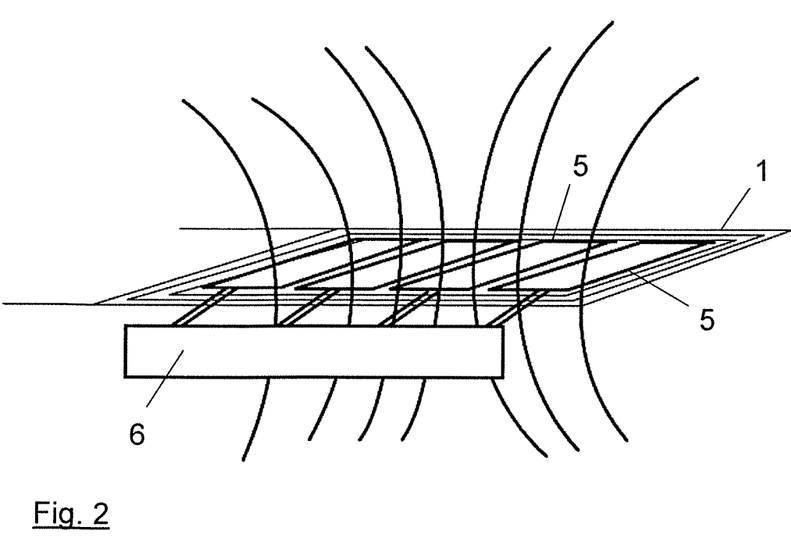
FIG. 2 is a schematic representation of an exemplary arrangement of multiple sensor coils in the proposed method or the proposed apparatus.

In the proposed method and the associated apparatus, sensor coils 5 are used for detecting foreign bodies within the transmission path. In the example shown in FIG. 2, these are designed as compensated conductor loops, which are preferably positioned in the region enclosed by the primary coil 1 or above this region. In this case, the respective sensor coils 5 are connected to at least one capacitor to form a resonant circuit which is matched to the excitation frequency of the primary coil 1 and are thus coupled with the primary coil 1. The transmission field indicated by the magnetic field lines in FIG. 2 induces a voltage in each of the conductor loops or sensor coils 5, which generates currents which are each detected via a current transformer. The detecting and evaluating device 6 is also indicated in FIG. 2.

Figure 3:
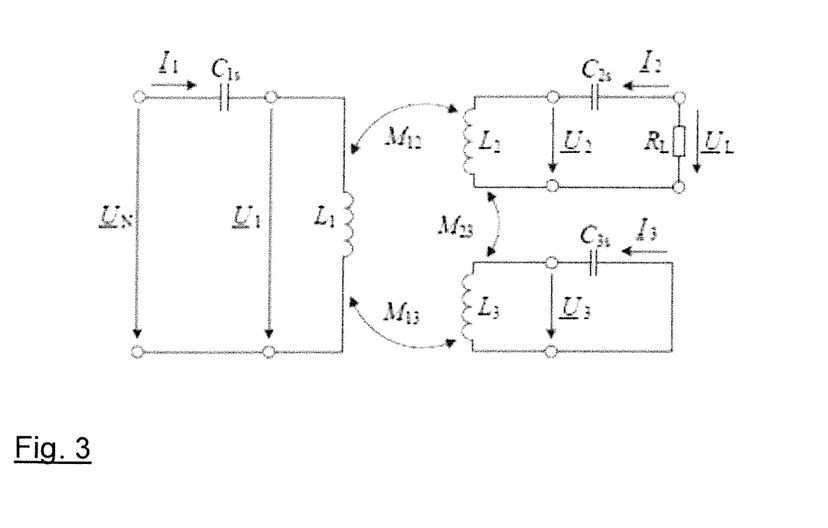
FIG. 3 is a schematic illustrating the energy transmission and detection in the proposed method or apparatus.

FIG. 3 shows an electrical circuit diagram for a design of such a transmission path. The primary circuit contains the primary coil $L_1$ as well as a capacitor $C_{1s}$. The voltage $U_N$ on the primary side is provided by an inverter, which preferably works with pulse duration or pulse width modulation. The energy transmission takes place by coupling the primary coil $L_1$ with the secondary coil $L_2$ of a secondary circuit that comprises a capacitor $C_{2s}$ as well as the load resistor $R_L$. The voltage $U_L$ on the secondary side is applied to the rectifier during charging processes. FIG. 3 also shows the proposed sensor coil $L_3$, which is connected to the capacitor $C_{3s}$ to form the corresponding resonant circuit. The current $I_3$ is detected in this closed resonant circuit for detecting a foreign body. The coupling between the individual coils $L_1$, $L_2$ and $L_3$ of this arrangement is indicated by the arrows with the coupling factors $M_{12}$, $M_{13}$ and $M_{23}$. Metallic foreign bodies influence the behaviour of coils coupled in this manner by changing the coupling factor and the self-inductances, and thus influence the current in the sensor coil. Therein, the phase position of the current in the resonant circuit of the sensor coil also changes compared to the voltage at the primary coil.

Figure 4:
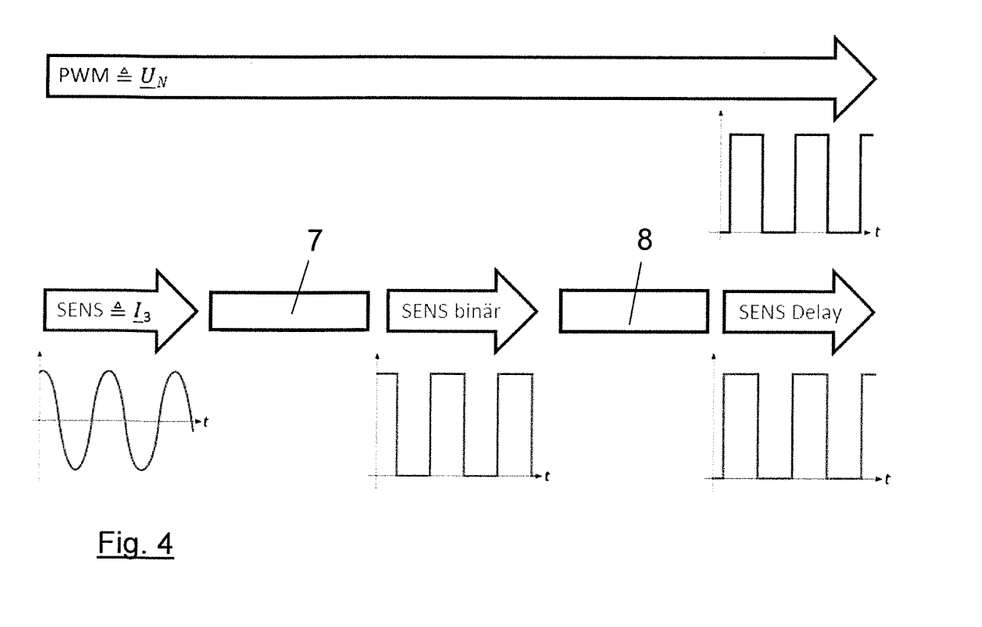
FIG. 4 shows an example of a comparison with a reference signal with prior calibration.

In the proposed method and the proposed apparatus, this phase position is detected in relation to a reference signal. Preferably, the PWM signal of the inverter is used as a reference signal for controlling the primary circuit. In an advantageous embodiment, the proposed apparatus is calibrated such that the phase angle between the voltage (PWM signal) in the primary circuit and the current in the sensor resonant circuit in a state without foreign bodies is 0°. This can be done via a delay element in the conductive path of the tapped current signal. As an example, FIG. 4 shows a comparison of the two signals, i.e. the PWM signal (PWM) and the current signal (SENS) after prior calibration. The drawing shows that the detected current signal in this example is first converted into a binary signal by means of a comparator 7 and then is adjusted to a phase angle of 0° in relation to the PWM signal by means of the delay element 8 (delay).

Figure 5A:
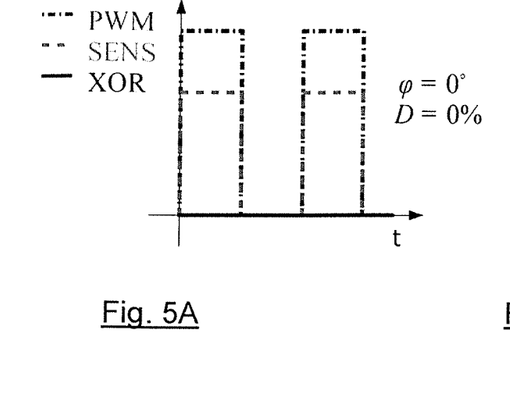
FIG. 5 shows an example of the comparison result of FIG. 5 without (partial figure A) and with (partial figure B) foreign bodies in the transmission path.
Figure 5B:
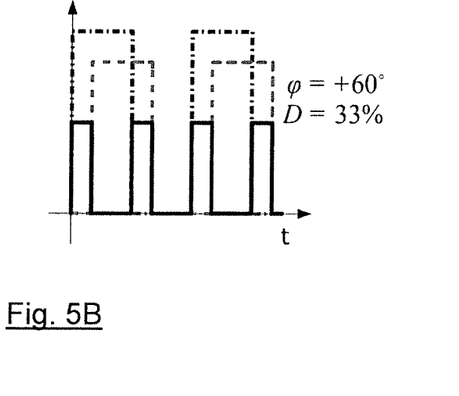

Following this calibration, the XOR comparison of the two signals, which in this example produces the signal to be detected, results in a value of 0 if no foreign body is present in the transmission path. This is indicated in FIG. 5A, which shows the PWM signal, the SENS signal and the XOR signal at the phase angle of 0° and the duty cycle of 0%. If a foreign body is present within the transmission path, this results in a value of the phase angle of ≠0° and a duty cycle of ≠0%, as indicated in an exemplary manner in FIG. 5B, which again shows the three signals of FIG. 5A.

In an inductive energy transmission path without a self-oscillating circuit, switching is usually light inductive. The current flowing into the primary coil lags the voltage by $\Phi_{prim}$=1-10°. This generates reactive power in the system, resulting in a different operating point. Another reason for a different operating point (different phase angle on the primary side) may also be a slightly offset positioning of the secondary side in relation to the primary side in the x, y, or z direction. The phase angle measured in the proposed method is $\Phi_{sensor}=\Phi_{offset}+\Phi_{FK}$. Changing the phase angle on the primary side creates an offset of $\Phi_{offset}$. This offset depends, among other factors, on the phase angle on the primary side $\Phi_{prim}$, and in the proposed method can be calibrated out in different ways, of which three variants are indicated in the following.

1) If a new operating point is set on the primary side, the currently measured phase angle $\Phi_{sensor}$ is calibrated to $\Phi_{sensor}=\Phi_{FK}$ by means of a signal delay $\Phi_{offset\_correction}$ in the controller or a delay element $\Phi_{offset\_correction}$. It is not required to measure $\Phi_{offset}$ for this purpose. This variant is particularly suitable when the primary side is excited with a fixed frequency, since $\Phi_{prim}$ does not need to be measured then. During calibration, it is of course important to ensure that no foreign body is present in the transmission field.

2) The offset $\Phi_{offset}$ is subtracted in the controller, which measures the $\Phi_{sensor}$. To this end, $\Phi_{offset}\sim\Phi_{prim}$ must also be measured. This variant is particularly suitable for an autoresonant method in which $\Phi_{prim}$ is regulated, as $\Phi_{prim}$ must inherently be measured in this case and thus is already available.

3) The sensor resonant circuit is extended with the help of an x-stage cascade of capacitors, which can be added individually or in groups. This cascade makes it possible, depending on the operating point in the primary circuit, to adjust the sensor resonant circuit in such a manner that no offset is created.

The latter two options for adjusting the offset are particularly stable in the event of load fluctuations and fluctuations of the operating point.

As an alternative to the comparison with the primary-side voltage, the offset of the phase angle $\Phi_{sensor}$ of the current in the sensor resonant circuit in relation to the voltage in the sensor resonant circuit, as a reference signal, can also be measured. This method is completely independent of the operating point and does not require any calibration or offset comparison.

Figure 6:
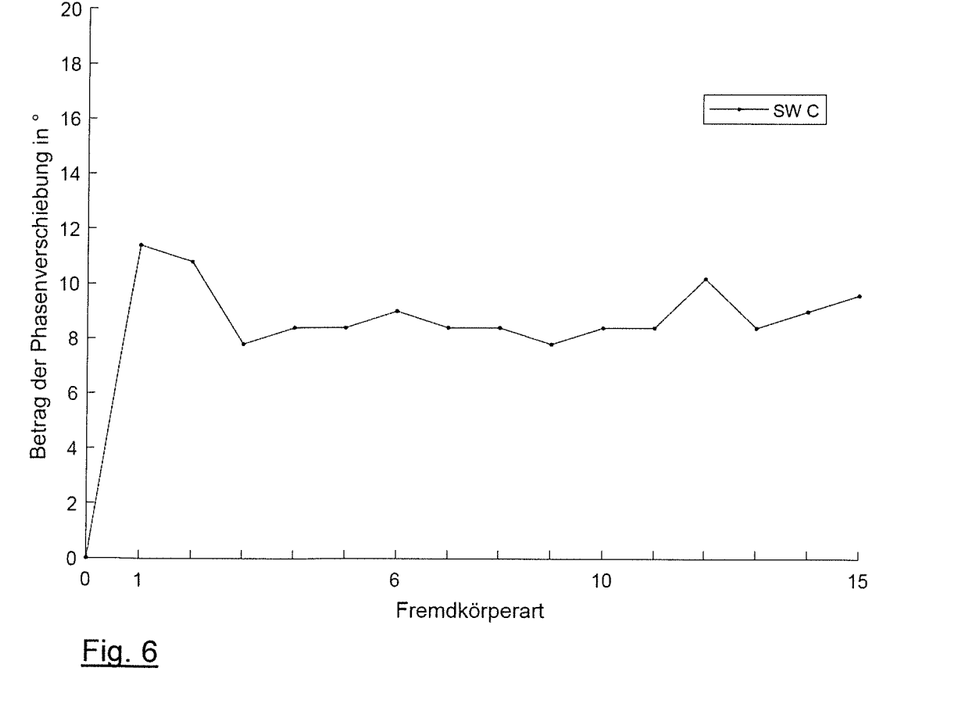
FIG. 6 shows an example of a measurement of the phase shift in the presence of different foreign bodies in the transmission path.

The proposed method and the associated apparatus take advantage of the fact that an additional sensor winding with small inductance is very strongly influenced by a metallic foreign body. The influence is much stronger than it is on one of the energy-transmitting windings ($L_1$ or $L_2$). FIG. 6, by way of example, shows a measurement with a rectangular sensor winding with dimensions of 2×20 cm, during which different foreign bodies were successively positioned in the transmission path. These foreign bodies are foreign bodies made of different metallic materials, such as aluminium, copper and steel, with different cross-sectional areas and different thicknesses between 0.5 and 3 mm, some of which were arranged longitudinally or transversely to the sensor winding. The measurement shown in FIG. 6 shows the measured phase shift on the y-axis, and on the x-axis indicates the different foreign bodies with the numerals 1 to 15, the lateral dimensions of which foreign bodies are also indicated in the drawing. The drawing shows that the absolute amount of phase shift of the current in the sensor winding is within a well-detectable range and is almost independent of the material and dimensions of the foreign body.

Figure 7A:
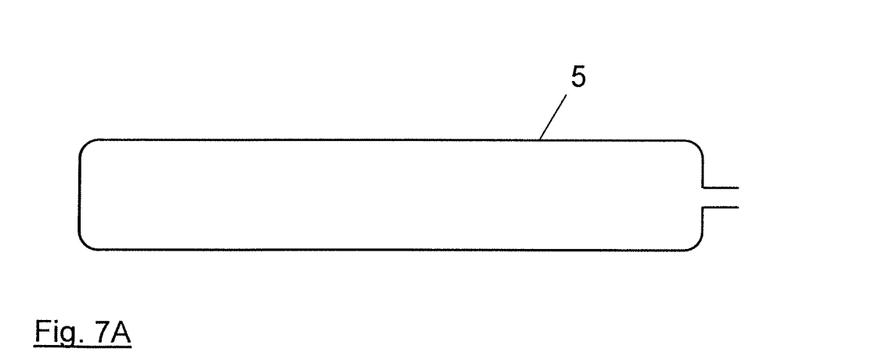
FIG. 7 shows two examples of the geometry of sensor coils as they can be used in the proposed method and the associated apparatus.
Figure 7B:
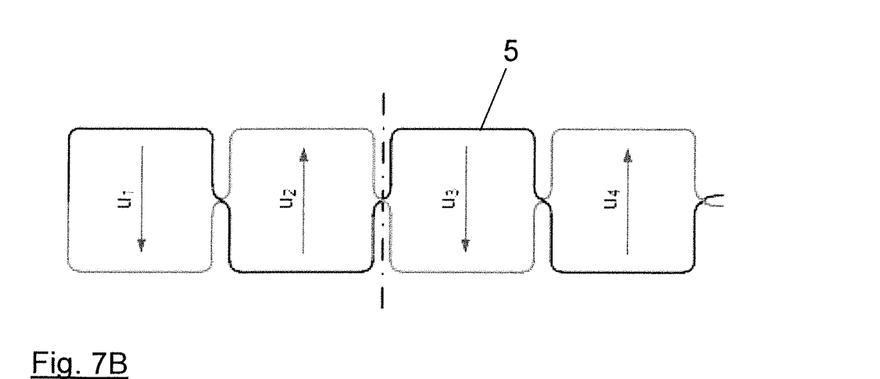

FIG. 7, by way of example in partial figure A, shows a simple geometry of the sensor winding of a sensor coil 5 and in partial figure B shows a more complex geometry of a sensor coil 5, as they can be used in the proposed method and the associated apparatus. The proposed method reacts to the change in inductance of the sensor coil due the influence of the foreign body. Even a very small change in inductance of the primary coil 1 ($L_1$) leads to a large change in the inductance of the sensor coil 5 ($L_3$), which leads to a pronounced trimming of the sensor resonant circuit and is easy to detect. Suitable geometries of the sensor coils 5 can lower the inductance of the sensor winding without making the windings smaller. FIG. 7B shows such a sensor winding, which is particularly well suited for use in the proposed method and the associated apparatus, as the self-inductance decreases due to the crossings and the relative influence of a foreign body increases. Such a sensor winding does not have to have the rectangular shape shown here in individual partial areas, but can also have, for example, circular or elliptical shapes in these areas.

In the preferred application, in which the primary coil is arranged in the ground, the sensor winding or sensor coil is arranged above the primary coil. Usually, the primary coil is located under a cover. The sensor coil is preferably integrated or attached as close as possible to the surface of this cover, to be as close as possible to foreign bodies resting on the cover.

The method is completely independent of the operating point of the energy transmission path, both against changes in the active power and against changes in the reactive power. The sensor resonant circuit having the sensor coil can be designed such that it is completely galvanically isolated from the energy transmission path, making it particularly safe and insensitive to interference coupling by EMC. The method and the apparatus enable a very accurate detection of metallic foreign bodies. The phase position in relation to a passive winding results in a much higher change than if the phase position were detected in the energy-transmitting primary winding. The separate resonant circuit is more sensitive than other changes of values measured at the sensor winding. Arranging multiple sensor coils with corresponding resonant circuits, for example in the form of an array, also makes it possible to determine the position of the metallic foreign body.

LIST OF REFERENCE SIGNS

1 Primary coil ($L_1$)
2 Secondary coil ($L_2$)
3 Electric vehicle
4 Metallic foreign body
5 Sensor coil ($L_3$)
6 Detecting and evaluating device
7 Comparator
8 Delay element

The invention claimed is:

1. Method for detecting electrically conductive foreign bodies during inductive energy transmission between a primary coil (1) and a secondary coil (2), in particular during inductive charging processes, in which method at least one sensor coil (5) is arranged between the primary coil (1) and the secondary coil (2), and in which a current induced in the sensor coil (5) during the energy transmission is detected and evaluated,
characterized in that the sensor coil (5) is connected to at least one capacitor (C3s) to form a closed resonant circuit which is matched to an excitation frequency of the primary coil (1) and in that the phase position of the current in the closed resonant circuit in relation to a reference signal is used to determine whether one or multiple electrically conductive foreign bodies (4) are present between the primary coil (1) and the secondary coil (2);
wherein the reference signal is a voltage at the primary coil (1), or—in case of an excitation of the primary coil (1) based on a PWM signal—the reference signal is the PWM signal.

2. Method according to claim 1,
characterized in that
a calibration is carried out in advance, in which the phase position of the current in the resonant circuit in relation to the reference signal is detected without a foreign body (4) present between the primary coil (l) and the secondary coil (2).

3. Method according to claim 2,
characterized in that
the calibration takes place after each change of an operating point during the excitation of the primary coil (I).

4. Method according to claim 3,
characterized in that
a phase shift of the current in the resonant circuit in relation to the reference signal, which shift is detected during the calibration, is compensated for, or taken into account, when determining the presence of one or multiple foreign bodies (4).

5. Method according to claim 4,
characterized in that
the compensation is carried out by means of a delay element (8) or by means of a controller performing the determination.

6. Method according to claim 5,
characterized in that
the compensation is performed in the resonant circuit of the sensor coil (5) by changing the at least one capacitance (C3s).

7. Method according to claim 1,
characterized in that
multiple of the sensor coils (5) are arranged between the primary coil (1) and the secondary coil (2) and that, when detecting a foreign body (4), the approximate position of the foreign body (4) is determined from a comparison of the respective phase positions of the current in the resonant circuits of the sensor coils (5) in relation to the reference signal and from the positions of the sensor coils (5).

8. Apparatus for detecting electrically conductive foreign bodies during inductive energy transmission between a primary coil (1) and a secondary coil (2), in particular during inductive charging processes, which apparatus has at least one sensor coil (5) arranged above the primary coil (1),
characterized in that
the sensor coil (5) is connected to at least one capacitor (C3s) to form a close resonant circuit which is matched to an excitation frequency of the primary coil (1) and is connected to an evaluating device (6) which detects the current in the closed resonant circuit and which determines from a phase position of the current in the resonant circuit in relation to a reference signal whether one or multiple electrically conductive foreign bodies (4) are present between the primary coil (1) and the secondary coil (2);
wherein the evaluating device (6) is designed such that it uses a voltage at the primary coil (1) as the reference signal, or the primary coil (1) is connected to an excitation circuit which uses a PWM signal to excite the primary coil (1), and the evaluating device (6) is designed such that it uses the PWM signal as the reference signal.

9. Apparatus according to claim 8, characterized in that
the evaluating circuit (6) is designed such that it compensates for, or takes into account, a phase shift of the current in the resonant circuit in relation to the reference signal, which shift is detected during a calibration of the apparatus, when determining the presence of one or multiple foreign bodies (4).

10. Apparatus according to claim 9, characterized in that
the evaluating device (6) has a delay element (8) via which the phase shift of the current in the resonant circuit in relation to the reference signal, which shift is detected during the calibration of the apparatus, can be compensated for.

11. Apparatus according to claim 9, characterized in that
the evaluating device (6) is designed such that it subtracts the phase shift of the current in the resonant circuit in relation to the reference signal, which shift is detected during the calibration of the apparatus, from the phase position of the current in the resonant circuit when determining the presence of one or multiple foreign bodies (4).

12. Apparatus according to claim 9, characterized in that
the resonant circuit is connected to a cascade of capacitors which can be added individually or in groups for changing the capacitance (C3*s*) in the resonant circuit for compensating for the phase shift of the current in the resonant circuit in relation to the reference signal, which shift is detected during the calibration of the apparatus.

* * * * *